United States Patent [19]

Goodnow et al.

[11] Patent Number: 5,793,815
[45] Date of Patent: Aug. 11, 1998

[54] CALIBRATED MULTI-VOLTAGE LEVEL SIGNAL TRANSMISSION SYSTEM

[75] Inventors: Kenneth Joseph Goodnow, Essex Junction; Michel Salib Michail, South Burlington; Wilbur David Pricer, Charlotte; Sabastian Theodore Ventrone, So. Burlington, all of Vt.

[73] Assignee: International Business Machines Corporation, Armonk, N.Y.

[21] Appl. No.: 766,240

[22] Filed: Dec. 13, 1996

[51] Int. Cl.⁶ .............................. H04L 25/34; H04L 25/49
[52] U.S. Cl. .............................................. 375/286
[58] Field of Search ............................ 375/286, 288, 375/295; 341/56, 118

[56] References Cited

U.S. PATENT DOCUMENTS

| | | | |
|---|---|---|---|
| 3,760,277 | 9/1973 | Whang | 340/347 DD |
| 3,761,818 | 9/1973 | Tazaki et al. | 375/286 |
| 4,602,374 | 7/1986 | Nakamura et al. | 375/286 |
| 4,631,428 | 12/1986 | Grimes | 307/475 |
| 4,860,010 | 8/1989 | Iwamatsu | 341/118 |
| 4,860,309 | 8/1989 | Costello | 375/286 |
| 5,023,483 | 6/1991 | May | 307/463 |
| 5,160,929 | 11/1992 | Costello | 341/57 |
| 5,243,625 | 9/1993 | Verbakel et al. | 375/286 |
| 5,255,287 | 10/1993 | Davies et al. | 375/286 |
| 5,257,026 | 10/1993 | Thompson et al. | 341/118 |
| 5,394,438 | 2/1995 | Takai | 375/286 |
| 5,408,498 | 4/1995 | Yoshida | 375/286 |
| 5,444,740 | 8/1995 | Mizukami et al. | 375/286 |
| 5,450,023 | 9/1995 | Yang et al. | 326/60 |
| 5,499,269 | 3/1996 | Yoshino | 375/257 |

*Primary Examiner*—Temesghen Ghebretinsae
*Attorney, Agent, or Firm*—Schmeiser, Olsen & Watts; Eugene I. Shkurko

[57] ABSTRACT

A calibrated multi-voltage level system is disclosed having a network of devices, including a first and a second device. The first device comprises a processor for generating data, an encoding unit for encoding the data into a first data signal having multiple voltage levels, and a transmitting unit for transmitting the encoded data signal to the second device. The first device also comprises a calibration unit for sending a first calibration signal to the second device, and for storing a second calibration signal from the second device; and an adaptation unit for correcting the second data signal from the second device with the stored second calibration signal.

20 Claims, 3 Drawing Sheets

CALIBRATED MULTI-VOLTAGE LEVEL SIGNAL TRANSMISSION SYSTEM

BACKGROUND OF THE INVENTION

1. Technical Field

The invention relates generally to signal transmission systems, and more specifically, to multi-voltage level signal transmission systems.

2. Background Art

Previously, performance improvements in microprocessor design have outstripped the performance of bus, board and overall system design. That is because improvements in microprocessor design have been derived from many sources, including: advances in silicon technology performance; enhanced levels of integration; and the introduction of parallelism in execution with the microprocessor. Conversely, improvements in board design have been retarded by the essentially fixed physical dimensions of the board, box, bus, and sockets. Any major bus speed improvements of the past have been accomplished by widening the bus or increasing the number of pins or wires on the data bus, which, as aforementioned, is severely limited by the fixed physical dimensions of the board, box, bus and sockets.

One solution to increasing bus bandwidth without having to increase the numbers of wires or pins on the data bus, is by increasing the amount of information carried on a single wire or pin. This increase in information is accomplished by sending more information in parallel over the same wires by encoding the information into more than binary levels at the same frequency as previously used. The following discussion illustrates the example of converting two binary inputs into quadruple voltage levels. The reader should understand, though, that this technique can be expanded to more levels than four. Two bit encoding would be accomplished by establishing four different voltage levels on the bus. This encoding could be accomplished by a conventional digital-to-analog convertor at the transmitting end of the bus. The receiver would use an analog-to-digital convertor to unencode the data to the receiving node. Conversely, the encoding could be done by specially designed digital-to-digital decoders; as will be described later.

Practical implementation of the multi-voltage solution encounters one immediate problem: present personal computer buses encompass many option sockets, which may be either unpopulated, or populated with a wide variety of options, or devices (e.g., printers, memory, etc.). The transfer characteristics of the bus are strongly influenced by the pluggable options implemented and the particular socket location of each device. Clean termination of the bus transmission lines is not possible. Thus, a network made up of a bus and many option sockets, may be poorly characterized, time variant and may pose an intractable problem for proper transmission line termination. In this environment where binary detection is difficult enough, quadruple detection would appear impractical.

One solution for correcting time variations of a multi-voltage level signal is through the use of a calibration signal. Some examples of using calibration signals in multi-voltage level bus systems include: U.S. Pat. No. 3,761,818, "Multilevel Signal Transmission System", issued to Tazaki et al. in September 1973; and U.S. Pat. No. 5,499,269, "Transmission-Reception Circuit", issued to Yoshino in March 1996. Specifically, U.S. Pat. No. 3,761,818 discloses a system that may transmit a calibration signal before the actual multilevel signal for referencing the different voltage levels. U.S. Pat. No. 5,499,269 discusses a system that uses calibration signals to determine the thresholds of the multiple voltages.

Although the above-mentioned patents use a calibration signal for correcting the time variation on a specific transmission line, the processes disclosed may be very time consuming and impractical in a network of devices. That is, since the aforementioned patents do not record the history of the point-to-point transfer characteristics of a transmission path between any two devices in a network, a new calibration signal would need to be sent each time a multi-voltage level signal is transmitted between any two devices, to adequately characterize that specific transmission path. Furthermore, the aforementioned patents would not be able to automatically handle the transfer of signals to a device if that device was incompatible with a multi-voltage level system.

Accordingly, a need has developed in the art for a multi-voltage level system that will store the point-to-point transfer characteristics of a transmission path in a network, and automatically handle the transfer of data signals to a device even if that device was incompatible with a multi-voltage level system.

SUMMARY OF THE INVENTION

It is thus an advantage of the present invention to provide a multi-voltage level system that will store the point-to-point transfer characteristics of each transmission path in a network.

It is yet another advantage of the present invention to provide a multi-voltage level system that automatically handles the transfer of signals to a device even if that device is incompatible with a multi-voltage level system.

The foregoing and other advantages of the invention are realized by a calibrated multi-voltage level system having a network of devices, including at least a first and a second device. The first device comprises a processor for generating data, an encoding unit for encoding the data into a first data signal having multiple voltage levels, and a transmitting unit for transmitting the encoded data signal to the second device. The first device also comprises a calibration unit for sending the maximum amplitude of the multiple voltage levels of the first data signal to the second device, and for storing a second maximum amplitude of the multiple voltage levels of a second data signal from the second device; and an adaptation unit for correcting the second data signal from the second device with the stored second maximum amplitude.

The foregoing and other objects, features, and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

DETAILED DESCRIPTION OF THE DRAWINGS

Figure 1:
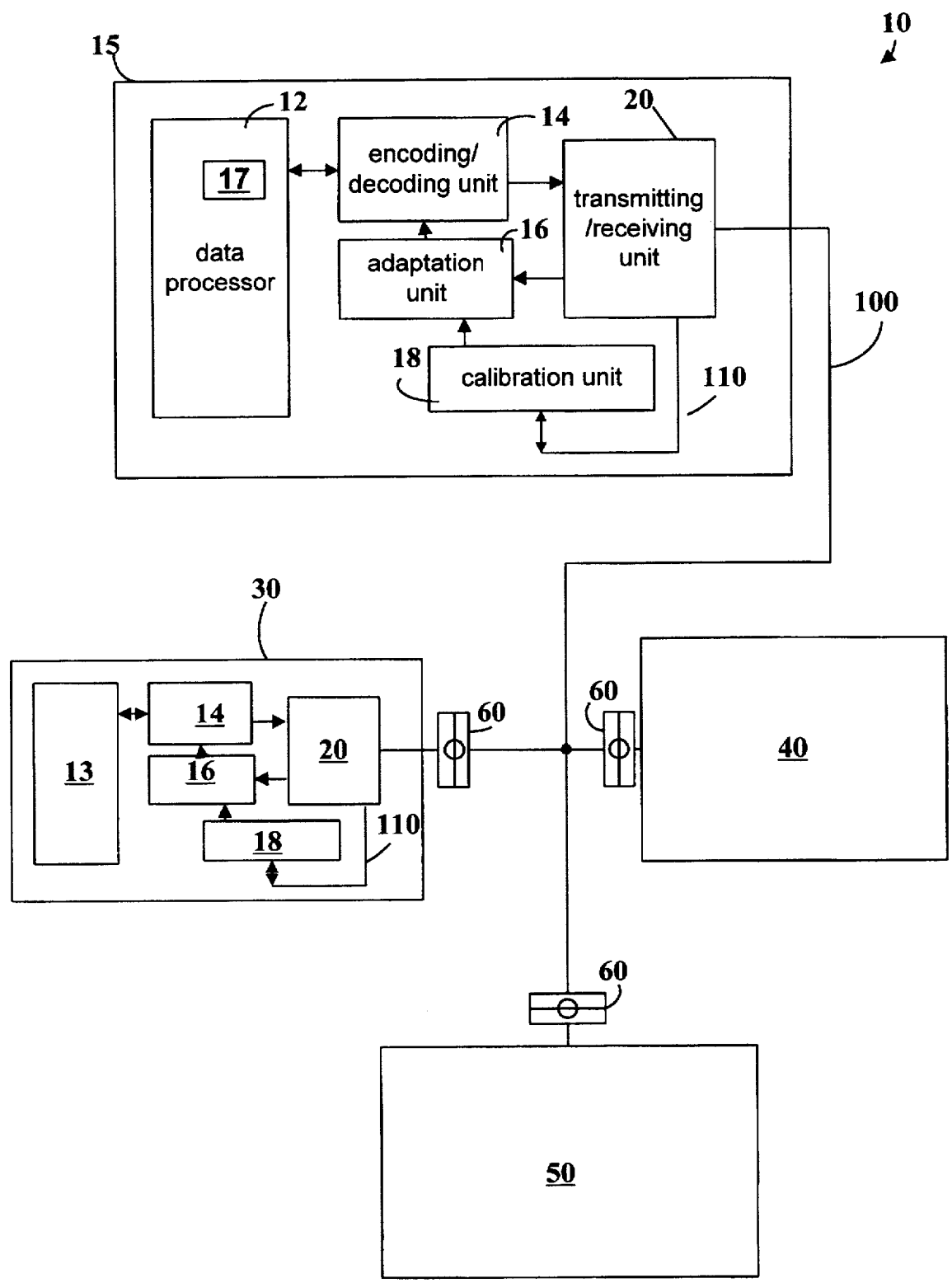
FIG. 1 is a block diagram of a multi-voltage level system in accordance with a first embodiment of the present invention.

Referring to FIG. 1, a calibrated multi-voltage level system 10 of an embodiment of the present invention having a bidirectional, multi-wired bus 100 connecting a first device 15 to other multiple devices 30, 40 and 50 is shown. It is to be understood that the invention is not limited by the illustrated number of devices, other amounts and devices may be used. Devices 30, 40 and 50 are connected to bus 100 through pluggable option sockets 60. Although pluggable option sockets and devices are shown, other connections and devices, such as hard-wired devices, may also be used. Also, some pluggable option sockets may not be populated with devices at any given time. First device 15 comprises data processor 12, encoding/decoding unit 14, transmitting/receiving unit 20, calibration unit 18 and adaptation unit 16. Similarly, a second device 30, which is also a multi-voltage level conversant device, comprises encoding/decoding unit 14, transmitting unit 20, calibration unit 18, adaptation unit 16, and option function A 13 (e.g., memory, disk drive).

Devices 40 and 50 may or may not be multi-voltage level conversant devices, but as aforementioned, the multi-voltage level system of the present invention will automatically handle the transfer of signals to these devices even though the devices may be incompatible with a multi-voltage level system. That is, the invention may be installed on a mixed protocol bus that features both binary and multilevel transmission. The sender (e.g., device 15), may then first inquire with a special command code from the data processor 12 whether multilevel communication is possible with a receiver (e.g., device 40). If the receiver does not reply, the receiver is treated as not being multilevel conversant, and binary level signals are sent. Alternately, using an error coding system 17 of data processor 12, the sender may automatically send multi-voltage level signals, and if an error occurs, retry with fewer multi-voltage levels until binary level signals are transmitted. In very noisy environments the sender will eventually resort to binary transmission anyway, even if the receiver is multilevel conversant.

Figure 2:
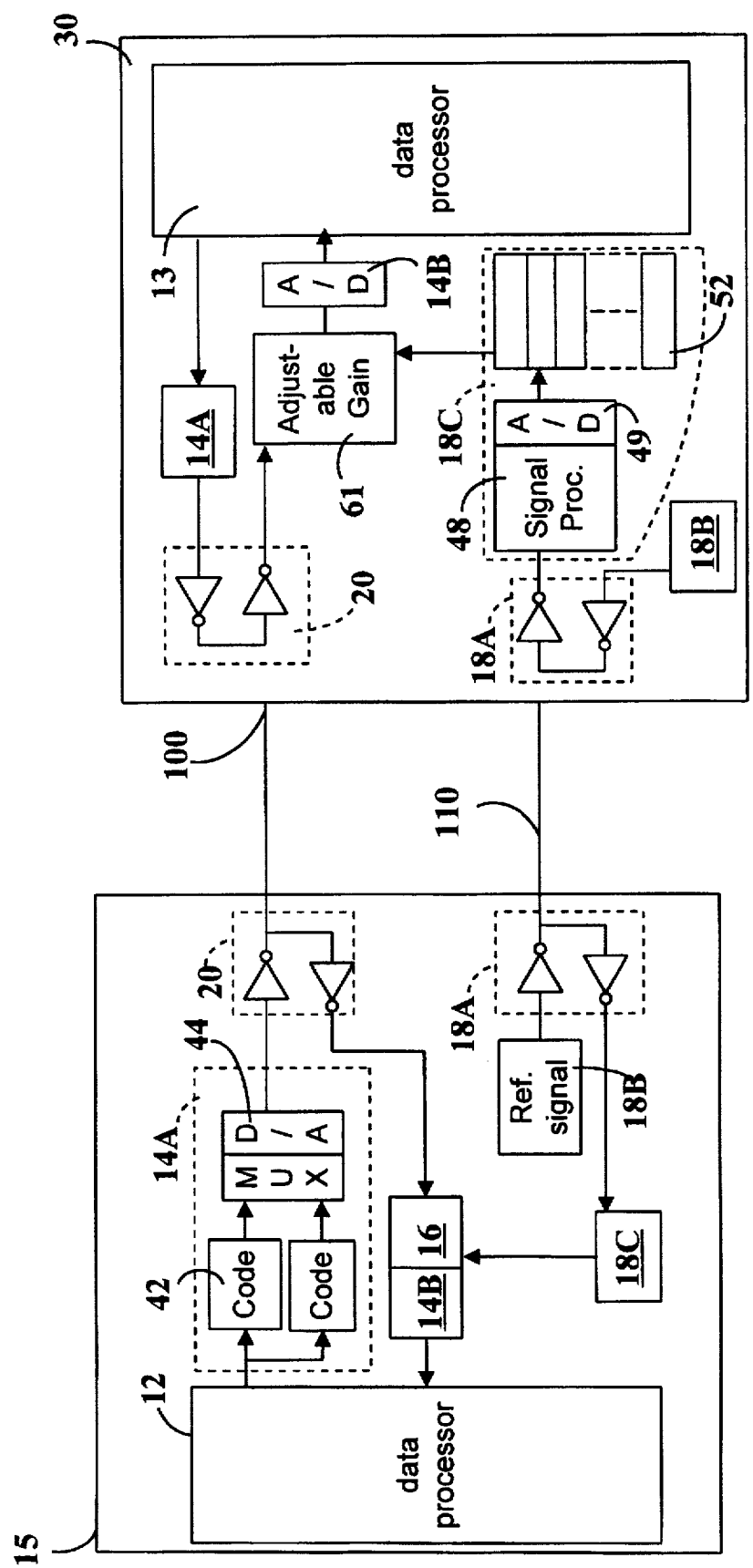
FIG. 2 is block diagram illustrating a second embodiment of the multi-voltage level system of FIG. 1.

In operation, data processor 12 of first device 15 generates data, which is then encoded into a first data signal having multiple levels by encoding unit 14. Transmitting unit 20 sends the encoded data signals to a second device 30 or to device 40 or 50 through a multi-wired, multi-voltage level bus 100. For example, if the data processor word is 64 bits wide, by using 2 bit encoding and encoding the data in parallel (as shown in FIG. 2), a 64 bit data word signal could be transmitted using only 32 wires or pins on bus 100.

In this embodiment, calibration line 110 is combined into and used with the regular bus line 100. Calibration line 110 may also be a separate line as illustrated in reference to FIGS. 2 and 3. The calibration signal (or signals) may be sent in any one of a number of different ways at a number of different times. For example, the calibration signal may be sent at initial program load (IPL) time. The calibration signal may also be sent before the actual data transmission, but sending the calibration signal at this time may delay the launching of the first data signal. Additionally, the calibration signal may be sent when the bus is not busy.

Calibration unit 18 sends a maximum amplitude of the first data signal to the second device. That is, the calibration signal of the first device represents the maximum voltage transient (0–3 in a quadruple level system) of the first data signal. More than one calibration signal may be sent to represent other voltage levels, but when using only one calibration signal, the other voltage levels may be easily obtained through dividing the signal accordingly. Calibration unit 18 also receives and stores the maximum amplitudes from the second device and from the other devices according to the device addresses, thus obtaining a history of and adequately characterizing the data transmission path from any one device to another device. Therefore, in subsequent transmissions between two devices, the calibration signal would not have to be sent again, thus improving process time.

After the second device 30 receives the first calibration signal and the first data signal, the adaptation unit 16 of second device 30 then corrects and calibrates the first data signal by comparing the first calibration signal to the first data signal and correcting the data signal's amplitude accordingly.

In FIG. 2, a detailed second embodiment of the multi-voltage level system of FIG. 1 is disclosed. As discussed in FIG. 1, two devices 15 and 30 transmit data signals through bus 100, which are calibrated through a calibration signal. Unlike FIG. 1, though, FIG. 2 discloses a separate calibration line 110 used for the calibration signal. In this example, an additional line is used as a calibrating source that level sets the analog to digital convertor 49. For this mode to be effective, each pluggable device in a multiple device system must exhibit the same node impedance to the calibration line that it does to all other lines of bus 100.

As seen in FIG. 2, a 2 bit encoding scheme is used, thus the encoding unit 14A of the sender (device 15) includes two code circuits 42 and MUX and digital-to-analog (D/A) converter circuits 44. Although a D/A circuit is shown, other converter circuits such as a digital-to-digital converter circuit may also be used and is shown below. The calibration unit 18A and 18B of the sender comprises reference signal 18A and transmitting/receiving circuit 18B. The time required for the conversion from digital to analog and analog to digital, would be compensated for in a pipeline situation of a computer, since, as one data word is being transmitted, a different data word can be converted.

The adaptation unit 16 of the receiver (device 30) comprises an adjustable gain amplifier 61, which as aforementioned, controls the gain of the data signal received from transmitting/receiving unit 20. The gain of the adjustable gain amplifier is controlled by the dedicated registers 52. The calibration unit of the receiver comprises the transmitting/receiving circuit 18A, signal process circuit 48, analog-to-digital converter circuit 49 and dedicated registers 52. Thus, the calibrated signal for each data path is sampled, digitally quantized, and stored in a dedicated register 52. Although certain circuits are referred to specifically in one type of device (sender or receiver), it is to be understood that both device 15 and device 30 have the capability and circuitry to be both sender and receiver. A network clock (not shown) provides a clock signal to both devices.

Figure 3:
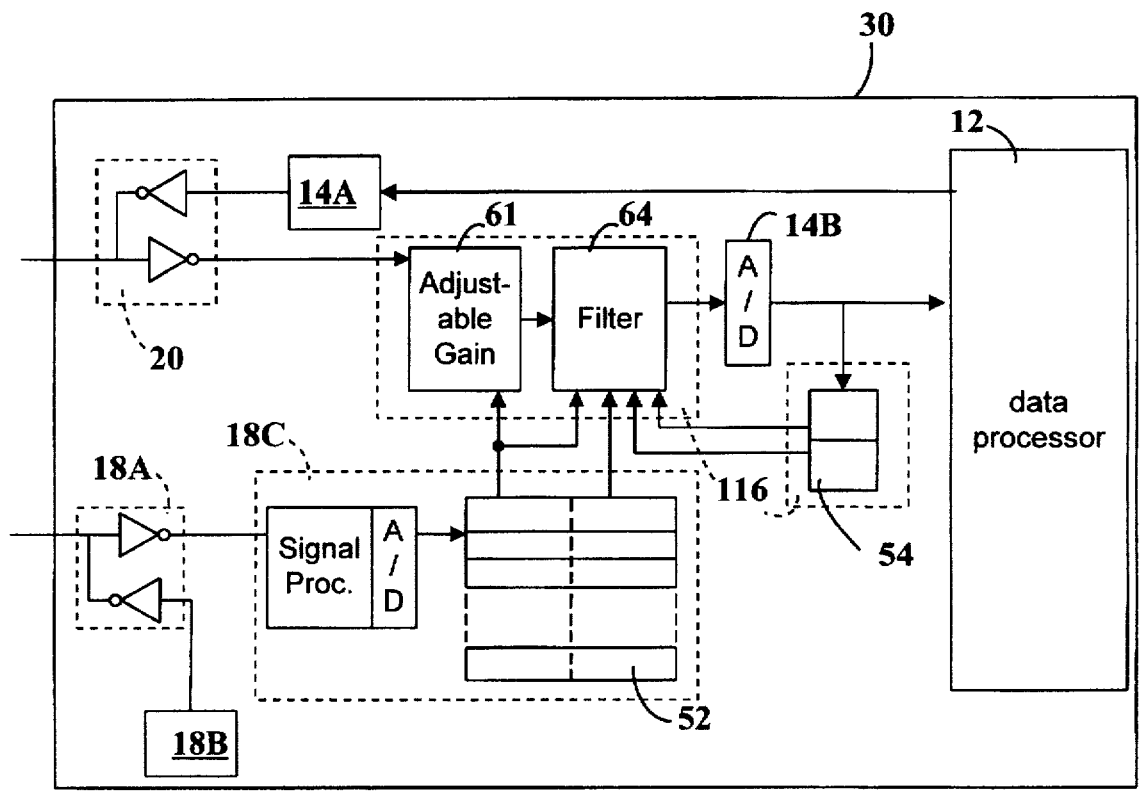
FIG. 3 is a block diagram illustrating a second embodiment of the adaptation unit of the multi-voltage level system of FIG. 2.

FIG. 3 illustrates a refinement to the calibration unit 18C and adaptation unit 16 of FIG. 2. In FIG. 3, the adaptation circuit 116, corresponding to the adaptation unit 16 of FIG. 2, now comprises adjustable gain amplifier 61, filter circuit 64 and shift register 54. The incoming data signal passes first through the adjustable gain amplifier 61 and then through a corrective filter circuit 64 which compensates for any residue of previous signals resulting from the smearing of the previously sent data. The calibration signal is sampled, digitally quantized, and stored twice (instead of once, as with FIG. 2) within the dedicated register 52. The first quantized level represents the attenuation of the maximum transition (0–3) at sensing time. The second quantized level represents this same maximum transition seen one sensing time later. The filter circuit 64 computes the amount of residue left from the previous signal and subtracts this amount from the output of the adjustable gain amplifier 61. The filter circuit 64 uses the two quantized levels in the dedicated register 52 and knowledge of the magnitude of the previous transient (data in shift registers 54) to calculate the amount of residue to be subtracted. In principle, this technique could be extended to compensate for more than the residue of one previous data signal.

Figure 4:
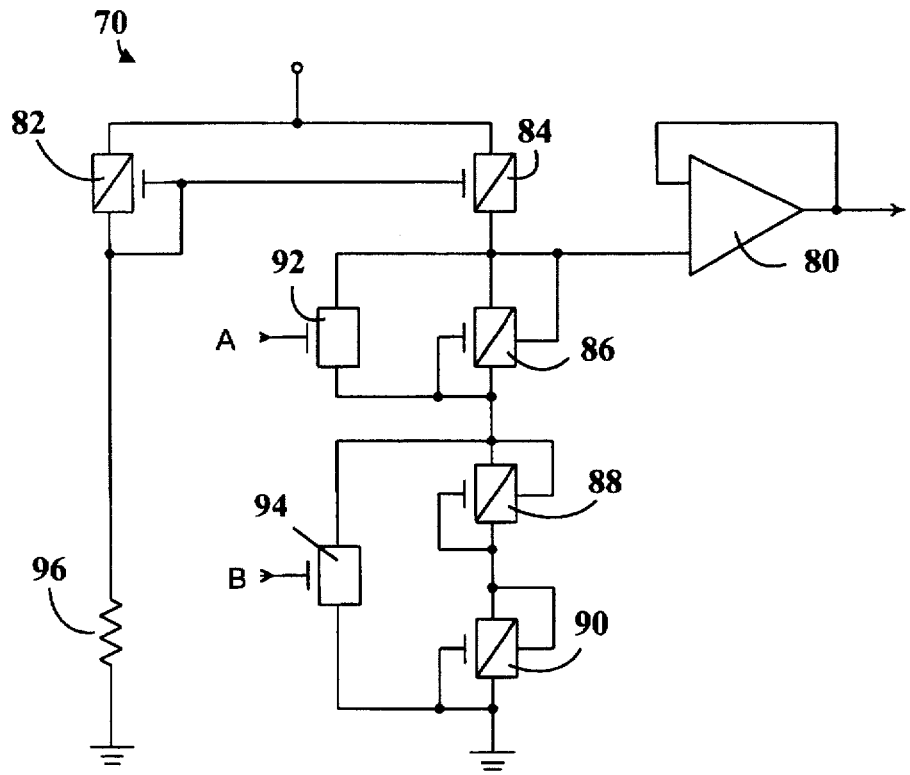
FIG. 4 is an exemplary circuit diagram of a digital-to-digital converter which may be used in the system of FIG. 1.

An example of a digital-digital conversion circuit 70 that may be used in place of the D/A circuit 44 of FIG. 2 is illustrated in FIG. 4. In this circuit, binary inputs A and B are converted to a four level output (output of device 80). Input A and input B are tied to the gates of transistors 92 and 94, respectively. The source of transistor 92 is connected to the drain of transistor 94. The source of transistor 94 is tied to ground, and to the gate and drain of transistor 90. The body and source of transistor 90 are tied together and to the gate and drain of transistor 88. The body and source of transistor 88 are tied together, are tied to the source of transistor 92, and to the drain and gate of transistor 86. The body and source of transistor 86 are tied together, are tied to the drain of transistor 92, to the drain of transistor 84, and to one of the inputs of amplifier 80. The source of transistor 84 is tied to the source of transistor 82 and to Vdd. The gates of transistors 82 and 84 are tied together, to the drain of transistor 82, and to resistor 96, which, in turn, is tied to ground. The output of amplifier 80 is tied to a second input, forming a unity gain amplifier. The output, as aforementioned generates an encoded, digital multi-voltage level signal corresponding to two binary inputs.

Thus, the present invention discloses a multi-voltage level system that will store the point-to-point transfer characteristics of a transmission path in a network, and automatically handle the transfer of signals to a device even if that device was incompatible with a multi-voltage level system.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A first device in a multi-voltage level system communicating with a second device through a bus, comprising:

a processor for generating data;

an encoding unit, coupled to said processor, for encoding said data into a first data signal having more than two voltage levels;

a transmitting unit, coupled to said encoding unit and said bus, for transmitting said first data signal to said second device and receiving a second data signal from said second device, said second data signal having more than two voltage levels;

a calibration unit, coupled to said bus, for sending a first calibration signal to said second device and for receiving and storing a second calibration signal from said second device; and an adaptation unit, coupled to said calibration unit and said encoding unit, for correcting said second data signal with said stored second calibration signal.

2. The device of claim 1, wherein said first calibration signal is the maximum amplitude of said first data signal.

3. The device of claim 1, wherein said calibration unit comprises dedicated registers for storing transfer characteristics of said second device.

4. The device of claim 3, wherein said adaptation unit comprises an adjustable gain amplifier wherein the gain of said adjustable gain amplifier is controlled by said dedicated registers of said calibration unit.

5. The device of claim 4, wherein said adaptation unit further comprises:

a shift register for storing a previously sent data signal; and a corrective filter circuit, coupled to said shift register and said adjustable gain amplifier, for correcting said second data signal with said previously sent data signal.

6. The device of claim 1, wherein said processor further comprises a command code for inquiring whether multilevel communication is possible with said second device.

7. A method for data communication in a network of devices having at least a first device coupled to a second device through a bus, comprising the steps of:

a) generating data and a calibration signal in said first device;

b) encoding said data into a data signal having more than two voltage levels;

c) transmitting said data signal and said calibration signal to said second device;

d) receiving and storing said calibration signal in said second device; and e) correcting said data signal with said stored calibration signal.

8. The method of claim 7, further comprising the steps of:

inquiring whether multilevel communication is possible with said second device; and transmitting a second data signal from said first device having binary levels if said multilevel communication is not possible.

9. The method of claim 7, further comprising the step of:

sending a second data signal having binary voltage levels if said first device receives an error from said transmitting of said data signal having more than two voltage levels.

10. The method of claim 7, wherein said calibration signal is the maximum amplitude of said data signal.

11. The method of claim 7, wherein step d) further comprises the step of:

storing point-to-point transfer characteristics of each transmission path of said network of devices in dedicated registers.

12. The method of claim 11, wherein step e) further comprises the steps of:

providing an adjustable gain amplifier;

controlling the gain of said adjustable gain amplifier with said dedicated registers; and correcting said data signal with said gain of said adjustable gain amplifier.

13. The method of claim 12, further comprising the step of:

storing a previously sent data signal; and filtering out residue from said corrected data signal with said previously sent data.

14. A multi-voltage level system having a network of devices coupled to a bus comprising:

1) a first device comprising:
   a processor for generating data;
   an encoding unit, coupled to said processor, for encoding said data into a first data signal having multiple levels;
   a transmitting unit, coupled to said encoding unit and said bus, for transmitting said first data signal;
   a first calibration unit, coupled to said bus, for transmitting a calibration signal;

2) a second device comprising:
   a receiving unit, coupled to said bus, for receiving said first data signal;
   a second calibration unit, coupled to said bus, for receiving and storing said calibration signal from said first device;
   an adaptation unit, coupled to said second calibration unit, for correcting said first data signal with said stored calibration signal; and
   a decoding unit, coupled to said adaptation unit, for decoding said corrected first data signal.

15. The system of claim 14, wherein said calibration signal is the maximum amplitude of said first data signal.

16. The system of claim 14, wherein said second calibration unit comprises dedicated registers for storing point-to-point transfer characteristics of each transmission path of said network of devices.

17. The system of claim 16, wherein said adaptation unit comprises an adjustable gain amplifier wherein the gain of said adjustable gain amplifier is controlled by said dedicated registers of said second calibration unit.

18. The system of claim 17, wherein said adaptation unit further comprises:
   a shift register for storing a previously sent data signal; and
   a corrective filter circuit, coupled to said shift register and said adjustable gain amplifier, for correcting said first data signal with said previously sent data signal.

19. The system of claim 14, wherein said processor further comprises: a special command code for inquiring whether multilevel communication is possible with said second device.

20. The system of claim 14, wherein said processor further comprises: an error coding system for determining whether said first data signal has been received by said second device.

* * * * *